J. G. LEYNER, DEC'D.
L. M. LEYNER, ADMINISTRATRIX.
TRACTOR.
APPLICATION FILED NOV. 11, 1920.
1,424,493.
Patented Aug. 1, 1922.
2 SHEETS—SHEET 2.
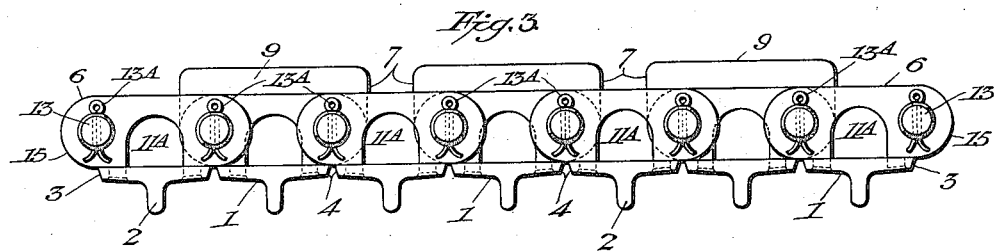
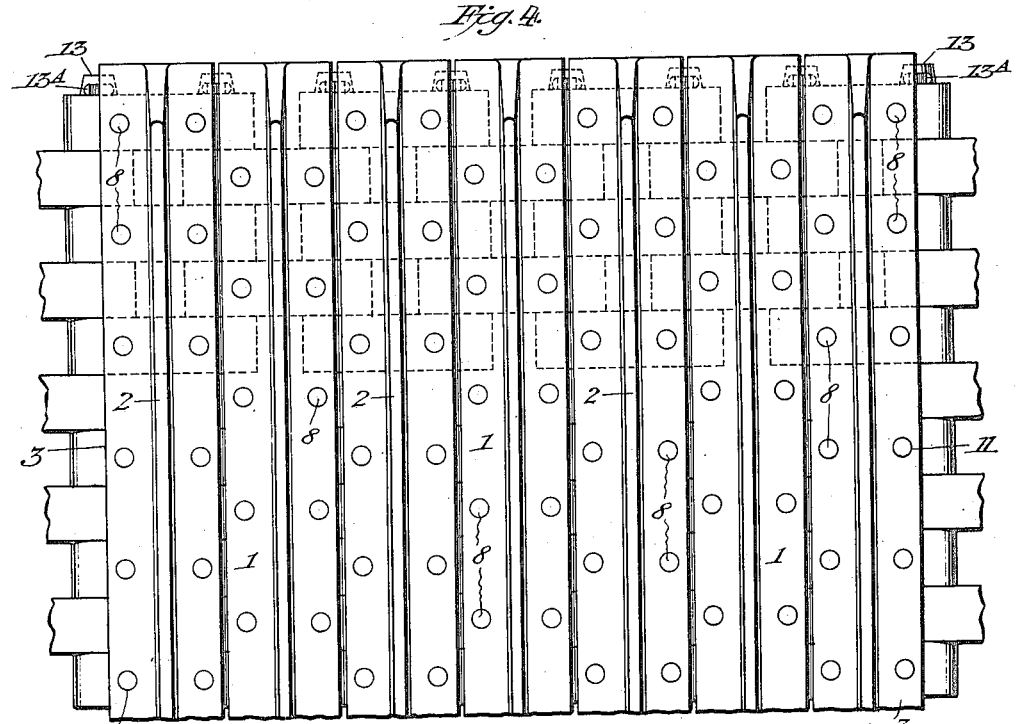
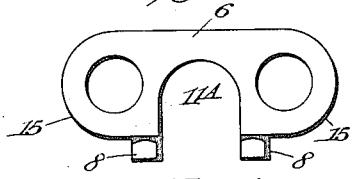
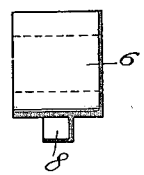
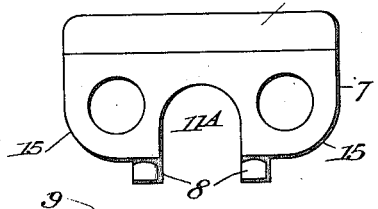
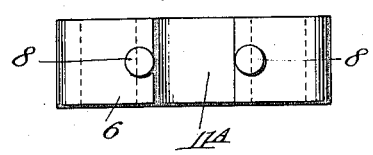
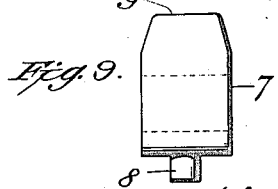

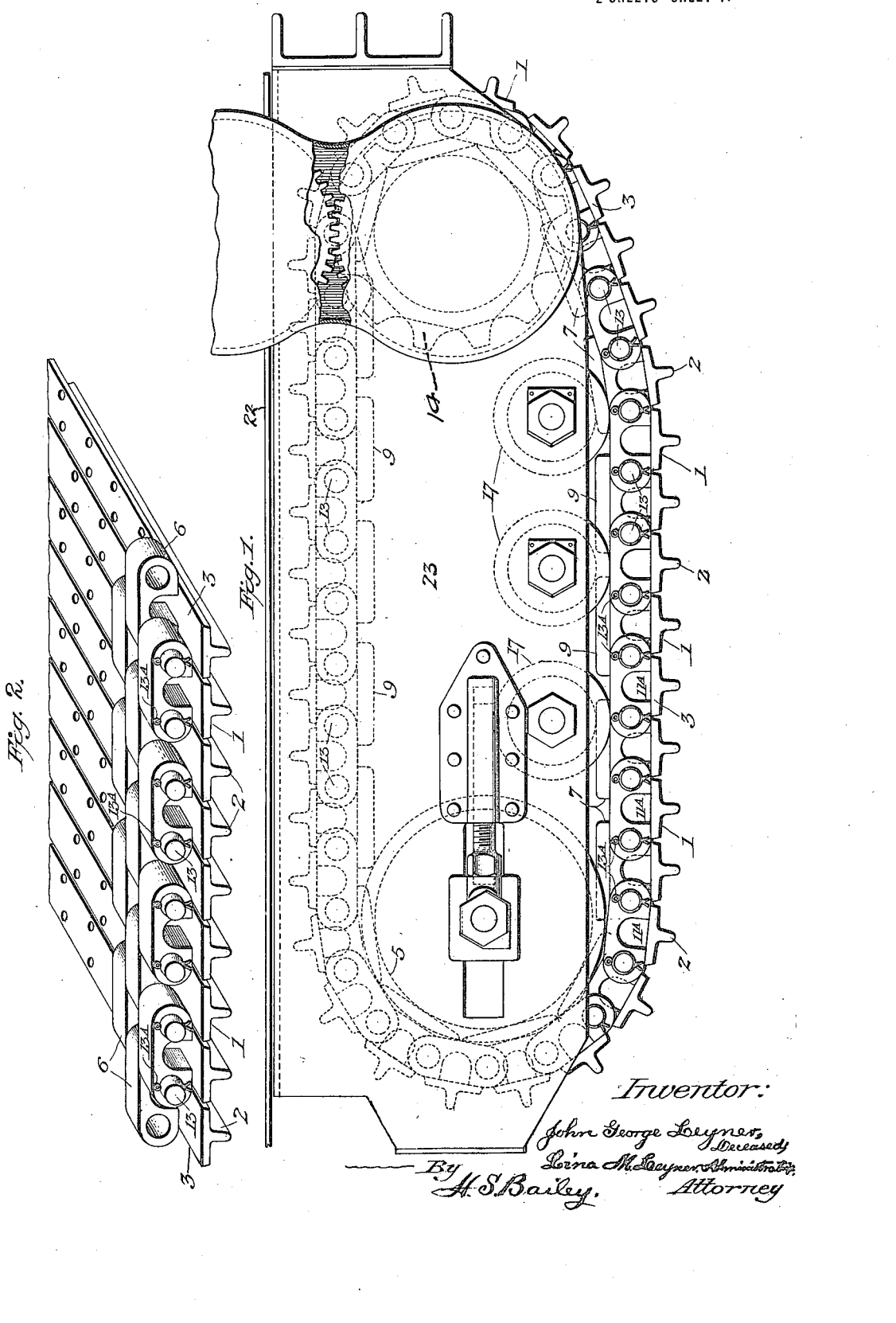

UNITED STATES PATENT OFFICE.

JOHN GEORGE LEYNER, DECEASED, LATE OF LITTLETON, COLORADO, BY LINA M. LEYNER, ADMINISTRATRIX, OF LITTLETON, COLORADO, ASSIGNOR TO THE LEYNER TRACTOR AND MANUFACTURING COMPANY, OF DENVER, COLORADO, A CORPORATION OF COLORADO.

TRACTOR.

1,424,493.     Specification of Letters Patent.     Patented Aug. 1, 1922.

Application filed November 11, 1920. Serial No. 423,434.

*To all whom it may concern:*

Be it known that JOHN GEORGE LEYNER, deceased, late a citizen of the United States of America, and resident of Littleton, county of Arapahoe, and State of Colorado, did invent a new and useful Improvement in Tractors, of which the following is a specification.

The invention relates to tractors and more particularly to the ground gripping part.

It is the general object of the invention to provide an endless track of simple construction and adapted for heavy duty.

It is a more particular object to provide an endless track with a simple, effective and durable ground gripping surface.

In order to more fully disclose the nature of the invention and the mode of application thereof I refer to the accompanying drawings in which Fig. 1 is a side elevation of a tractor construction embodying the invention.

Fig. 2 is a fragmentary perspective view of the endless track;

Fig. 3 is a side view thereof;

Fig. 4 is a bottom plan view thereof;

Figs. 5–7 are side view, bottom plan view and end view, respectively of one form of link forming part of the track; and Figs. 8 and 9 are side view and end view, respectively of another form of link employed.

The type of tractor to which the invention is applied is generally similar to the construction disclosed in the application of John G. Leyner Ser. No. 374,723 filed April 17, 1920 and the applications Ser. No. 423435 and Ser. No. 423436 filed Nov. 11, 1920.

In Fig. 1 is shown a platform 22 for carrying the tractor engine and other operating mechanism and lateral guard plates 23 for encasing the tractor mechanism including the sprocket wheels 14, idler drum 5 and intermediate drums 17 for maintaining the track in contact with the ground.

The track consists of a large plurality of links pivotally interconnected in staggered relation. Having reference to Figs. 5–9, each link has two transverse openings near its ends for receiving pins 13. The pins pass alternately through the front opening in one link and the rear opening in the next link and so on whereby the staggered relation is produced. At the opposite ends cotter pins 13$^A$ or other fastening means may be employed to hold the rods 13 in place.

The links 6 have rounded ends 15. All links in each series are spaced from each other and these spaces are engaged by the teeth of the sprocket wheels. The links 7 are provided with ribs 9 adapted to co-operate with corresponding grooves on the sprocket wheels as has been described in said applications.

The detail so far described does not form a part of the present invention.

The invention proper comprises the provision of shoes 1 connected to the links to provide a substantially continuous ground-engaging surface and to afford a large gripping action. The shoes 1 consist of plates 3 extending across the whole width of the track and ribs 2. As appears from Figs. 1–4 the width of the plates is such that their edges are nearly in contact with each other upon the ground. Each plate is connected to a link in alternate series. As shown in Figs. 5–9, each link has two rivet lugs 8 which pass through corresponding openings in the shoes and are upset to securely interconnect shoes and links.

Intermediate the lugs 8 the links have recesses 11$^A$ for the sake of economy of material.

The arrangement described not only increases the ground-gripping surfaces and the gripping action, but it is also instrumental in producing an exceedingly rigid construction adapted to withstand unusual strains without impairing the flexibility of the track.

The construction is such that all the elements making up the track can be easily manufactured and assembled.

What is claimed as new, and desired to be secured by Letters Patent, is:

1. In a tractor, an endless track comprising a plurality of series of links in substantially contiguous relation to each other, each link having pivot openings near its opposite ends, the links in alternate series being offset relatively to each other, pivot rods extending transversely through the links of all the series and shoes extending across all the series and connected to links in alternate series, the lateral edges of each shoe being in close proximity to the edges of the adjacent shoes.

2. Device according to claim 1 in which each link has on its outer surface two projections spaced in the direction of its length, the projections of each link being riveted in corresponding holes of a shoe.

3. Device according to claim 2 in which each link is recessed intermediate its two pivot holes and its two projections.

4. Device according to claim 1 in which each shoe has the form of a T-shaped bar, the flat side being connected to the links and the rib forming a ground gripping member.

In testimony whereof I affix my signature.

Mrs. LINA M. LEYNER,
*Administratrix of John George Leyner, deceased.*